United States Patent
Metcalf et al.

(10) Patent No.: US 11,435,221 B1
(45) Date of Patent: Sep. 6, 2022

(54) AUTOMATED SAND MANAGEMENT SYSTEM

(71) Applicants: Michael D. Metcalf, Beckville, TX (US); Charles Worthy, Jr., Longview, TX (US)

(72) Inventors: Michael D. Metcalf, Beckville, TX (US); Charles Worthy, Jr., Longview, TX (US)

(*) Notice: Subject to any disclaimer, the term of this patent is extended or adjusted under 35 U.S.C. 154(b) by 114 days.

(21) Appl. No.: 16/939,150

(22) Filed: Jul. 27, 2020

Related U.S. Application Data

(60) Provisional application No. 62/879,373, filed on Jul. 26, 2019.

(51) Int. Cl.
| | |
|---|---|
| *E21B 21/01* | (2006.01) |
| *G01G 19/14* | (2006.01) |
| *G01G 13/02* | (2006.01) |
| *G01G 21/23* | (2006.01) |
| *G01G 23/18* | (2006.01) |

(52) U.S. Cl.
CPC ........... *G01G 21/23* (2013.01); *E21B 21/01* (2013.01); *G01G 13/024* (2013.01); *G01G 19/14* (2013.01); *G01G 23/18* (2013.01)

(58) Field of Classification Search
CPC ...... E21B 21/01; G01G 13/024; G01G 19/14; G01G 21/23; G01G 23/18; B65B 1/32; B65B 37/02
See application file for complete search history.

(56) References Cited

U.S. PATENT DOCUMENTS

| | | | | |
|---|---|---|---|---|
| 900,990 | A * | 10/1908 | Edtbauer | G01G 13/00 177/75 |
| 3,147,813 | A * | 9/1964 | Farhadzadeh | E21B 21/08 177/1 |
| 3,351,236 | A * | 11/1967 | Sorenson | G01G 23/18 222/20 |
| 8,074,509 | B2 * | 12/2011 | Bingham | G01G 11/003 73/152.18 |
| 8,277,111 | B1 * | 10/2012 | Englot | B01F 5/043 366/138 |
| 2008/0196942 | A1 * | 8/2008 | Bingham | E21B 49/005 175/46 |
| 2021/0131256 | A1 * | 5/2021 | Coombe | E21B 43/35 |

FOREIGN PATENT DOCUMENTS

| | | | | |
|---|---|---|---|---|
| CN | 204730921 | U * | 10/2015 | |
| CN | 111071507 | A * | 4/2020 | |
| CN | 113250634 | A * | 8/2021 | |
| DE | 4003993 | A1 * | 8/1991 | G01G 19/14 |
| FR | 3026721 | A1 * | 4/2016 | B65B 37/02 |

* cited by examiner

*Primary Examiner* — Jennifer H Gay
(74) *Attorney, Agent, or Firm* — Ashkan Najafi

(57) ABSTRACT

An automated sand management system includes a frame, a power source, a control panel, an input pipe supported at the frame and configured to receive fluid removed from the existing wellbore, a gas buster tank configured to stabilize the fluid by relieving gas pressure from the fluid removed from the existing wellbore, an adjustable chain suspended chute configured to receive the fluid from the gas buster tank, a power-actuated sandbox configured to receive the fluid from the adjustable chain suspended chute, and a scale operably coupled to the power-actuated sandbox and the control panel. The scale is configured to weigh and report actual sand production in the fluid removed from the existing wellbore.

19 Claims, 20 Drawing Sheets

AUTOMATED SAND MANAGEMENT SYSTEM

CROSS REFERENCE TO RELATED APPLICATIONS

This is a non-provisional patent application that claims priority to and benefit of U.S. provisional patent application No. 62/879,373 filed Jul. 26, 2019, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relates generally to the field of oil and gas and, more particularly, to oil and gas machines and systems.

Prior Art

A wellbore is a hole that is drilled to aid in the exploration and recovery of natural resources such as oil and gas. Sand control is a method to control sand production that is being removed from the wellbore. This is common requirement for several oil and gas producing wells around the world. There are two situations which cause sand production. One cause is the erosion of shale from the formation downhole and the second one is from a stage of the well known as fracking. Creating microfractures throughout the formation and using sand to pump into formation to hold the formation open and remove the chance of a formation collapse. Sand production can lead to several issues such as production impairment due to sand plugging, erosion to completion equipment and iron, damage surface facilities such as a separator, piping, etc. Due to these issues, a suitable solution is desired.

Why is accurate monitoring of the sand important? Simply put, the less sand being sent to the operating companies production facility means less shut down and repairs due to sand erosion and washout of equipment, iron, etc.

Various attempts have been made to solve problems found in oil and gas machines and systems art. None of the disclosures and patents, taken either singly or in combination, is seen to describe the disclosure as claimed. Accordingly, a need remains for a reliable automated sand management system in order to overcome at least one aforementioned shortcoming. The exemplary embodiment(s) satisfy such a need by providing a portable system that is convenient and easy to use, lightweight yet durable in design, versatile in its applications, and designed for weighing and reporting actual sand production in the fluid removed from the existing wellbore.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an automated sand management system for monitoring and reporting actual sand production in fluid removed from an existing wellbore. These and other objects, features, and advantages of the non-limiting exemplary embodiment(s) are provided by an automated sand management system including a portable and transportable frame has a top platform configured to be fitted over an existing fluid collection tank associated with an existing wellbore, a power source located at the frame, a control panel operably coupled to the power source, an input pipe supported at the frame and configured to receive fluid removed from the existing wellbore, a gas buster tank supported at the frame and in communication with the control panel as well as the input pipe, wherein the gas buster tank is configured to stabilize the fluid by relieving gas pressure from the fluid removed from the existing wellbore, an adjustable chain suspended chute in fluid communication with the gas buster tank and situated subjacent thereto, wherein the adjustable chain suspended chute is configured to receive the fluid from the gas buster tank, a power-actuated sandbox in communication with the adjustable chain suspended slide and configured to receive the fluid from the adjustable chain suspended chute, and a scale operably coupled to the power-actuated sandbox and the control panel. Advantageously, the scale is configured to weigh and report actual sand production in the fluid removed from the existing wellbore.

In a non-limiting exemplary embodiment, the power-actuated sandbox includes a hydraulic pump attached to the platform, a manifold operably coupled to the hydraulic pump, a plurality of hydraulic cylinders coupled to the manifold and configured to telescopically extend and retract, and a compressor operably coupled to the hydraulic pump. Advantageously, the hydraulic pump is operably connected to the control panel and configured to facilitate articulation of the power-actuated sandbox between open and closed positions when the hydraulic cylinders extend and retract, respectively.

In a non-limiting exemplary embodiment, the hydraulic cylinders are attached to four corners of the power-actuated sandbox.

In a non-limiting exemplary embodiment, the frame includes a collapsible safety railing pivotally attached to the top platform, and a plurality of extendible legs attached to the top platform and directed downwardly therefrom.

In a non-limiting exemplary embodiment, the frame further includes a foldable ladder connected to the top platform, and a self-closing gate situated proximate to the foldable ladder.

In a non-limiting exemplary embodiment, the control panel is configured for remote user access and operation.

In a non-limiting exemplary embodiment, the top platform has an aperture. Advantageously, the adjustable chain suspended chute is aligned beneath the aperture and configured to receive the fluid discharged from the gas buster tank.

In a non-limiting exemplary embodiment, the hydraulic cylinders are operably coupled to the scale. Advantageously, the scale is in operable communication with the control panel for determining and transmitting a weight of the fluid.

In a non-limiting exemplary embodiment, the adjustable chain suspended chute is obliquely angled and sloped downwardly from the top platform to the power-actuated sandbox.

The present disclosure further includes a method of utilizing an automated sand management system for monitoring and reporting actual sand production in fluid removed from an existing wellbore. Such a method includes the steps of: providing and fitting a portable and transportable frame has a top platform over an existing fluid collection tank associated with an existing wellbore; providing and locating a power source at the frame; providing and operably coupling a control panel to the power source; providing and supporting an input pipe at the frame; providing and supporting a gas buster tank at the frame; communicating the gas buster tank with the control panel as well as the input pipe; providing and fluidly communicating an adjustable chain suspended chute with the gas buster tank; situating the adjustable chain suspended chute subjacent to the gas buster tank; the adjustable chain suspended chute receiving the fluid from the gas buster tank; providing and communicating a power-actuated sandbox with the adjustable chain suspended slide; and providing and operably coupling a scale to the power-actuated sandbox and the control panel.

The method further includes the steps of: the input pipe receiving fluid removed from the existing wellbore; the gas buster tank stabilizing the fluid by relieving gas pressure from the fluid removed from the existing wellbore; the power-actuated sandbox receiving the fluid from the adjustable chain suspended chute; and the scale weighing and reporting actual sand production in the fluid removed from the existing wellbore.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
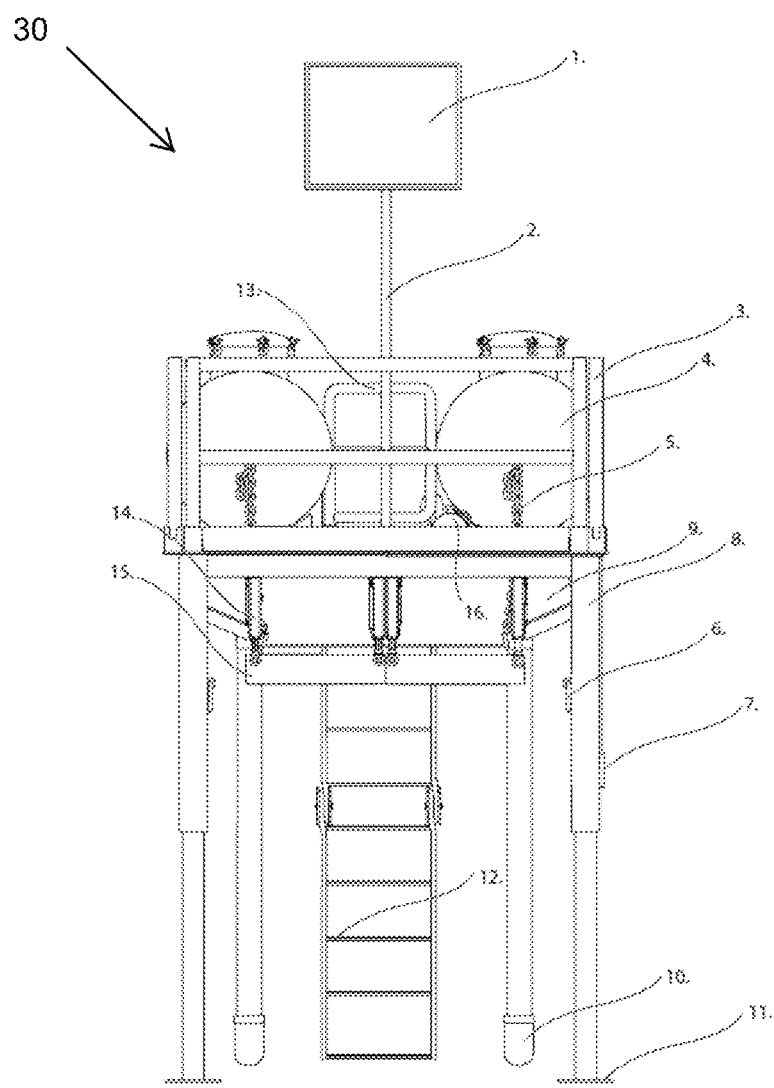
FIG. 1 is a front view of an automated sand management system according to an embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

Figure 2:
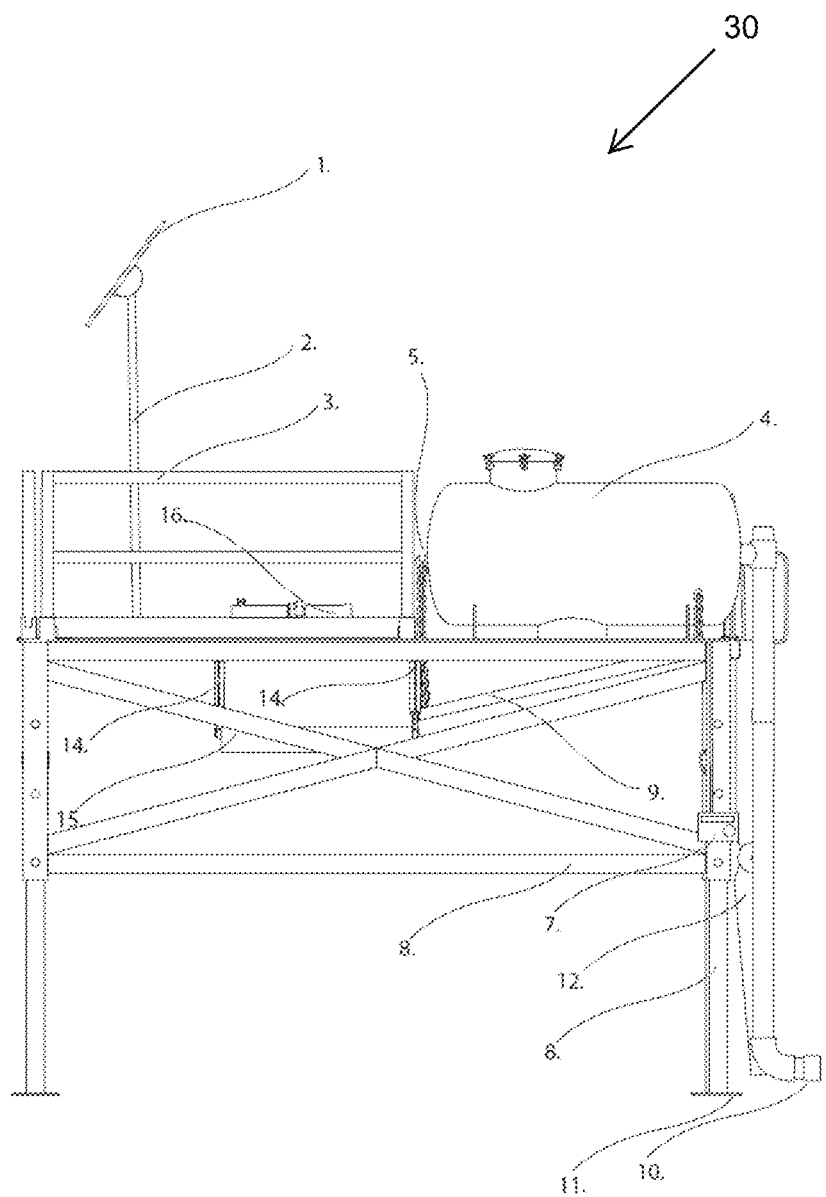
FIG. 2 is a side view illustrating the automated sand management system according to an embodiment of the present disclosure.
Figure 3:
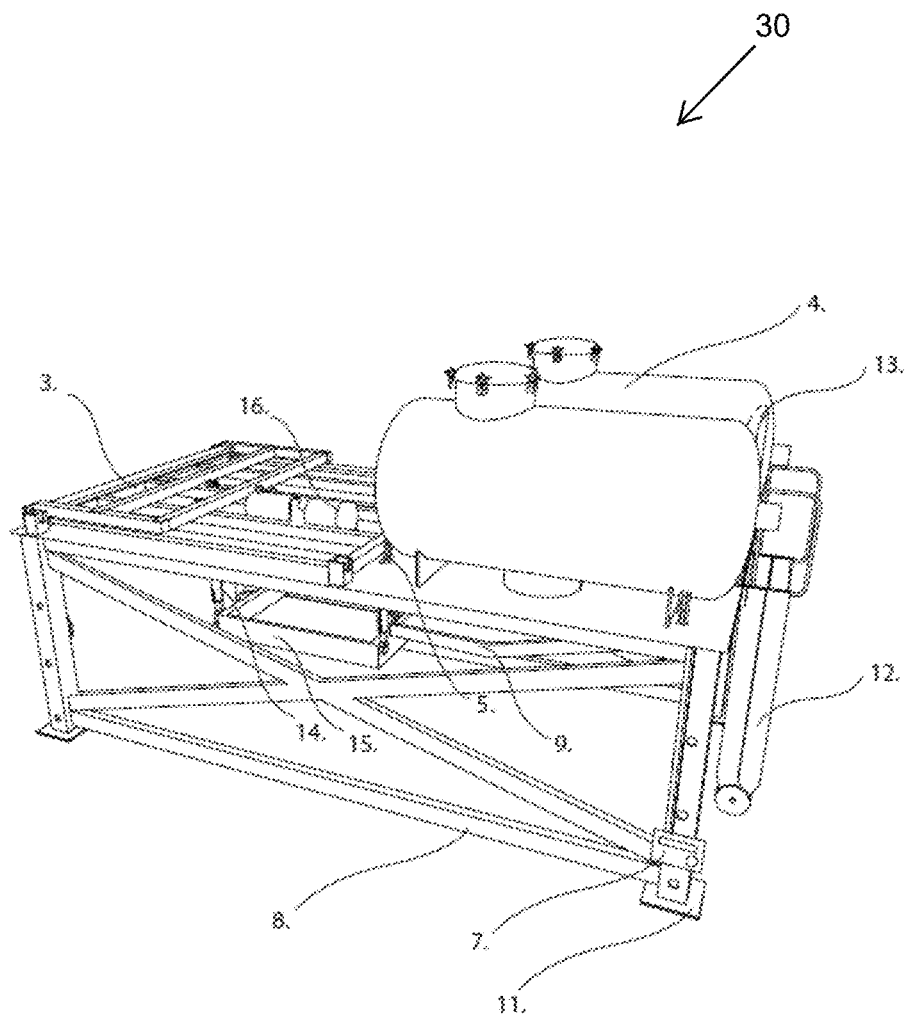
FIG. 3 is a perspective view illustrating the automated sand management system according to an embodiment of the present disclosure.
Figure 4:
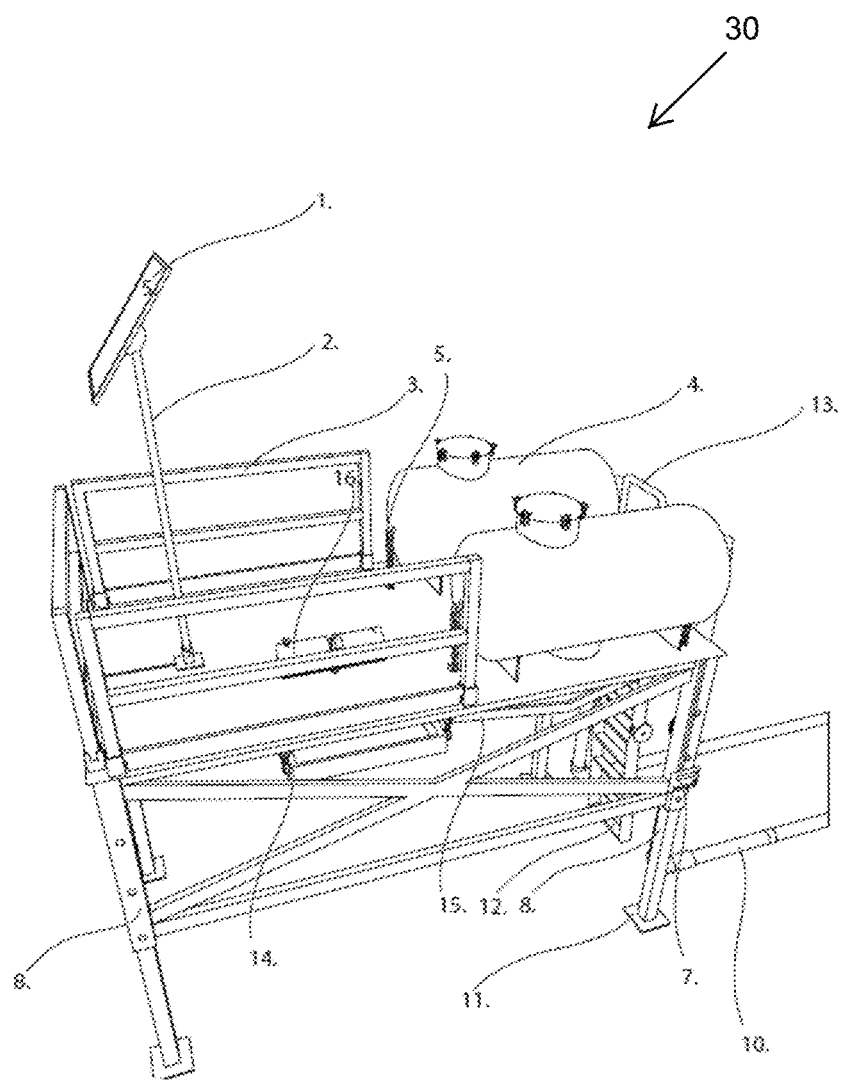
FIG. 4 is a perspective view illustrating the automated sand management system according to an embodiment of the present disclosure.
Figure 5:
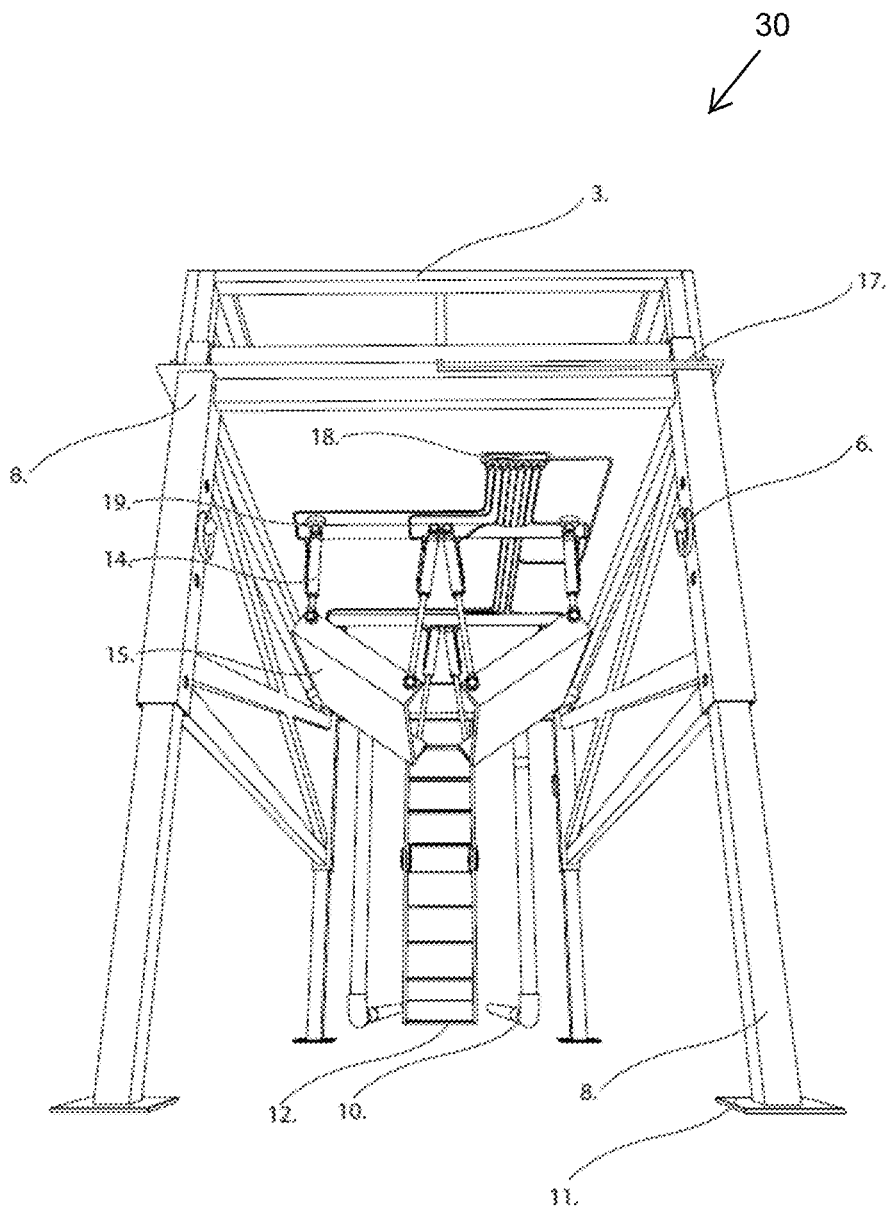
FIG. 5 is a bottom view illustrating the automated sand management system according to an embodiment of the present disclosure.
Figure 6:
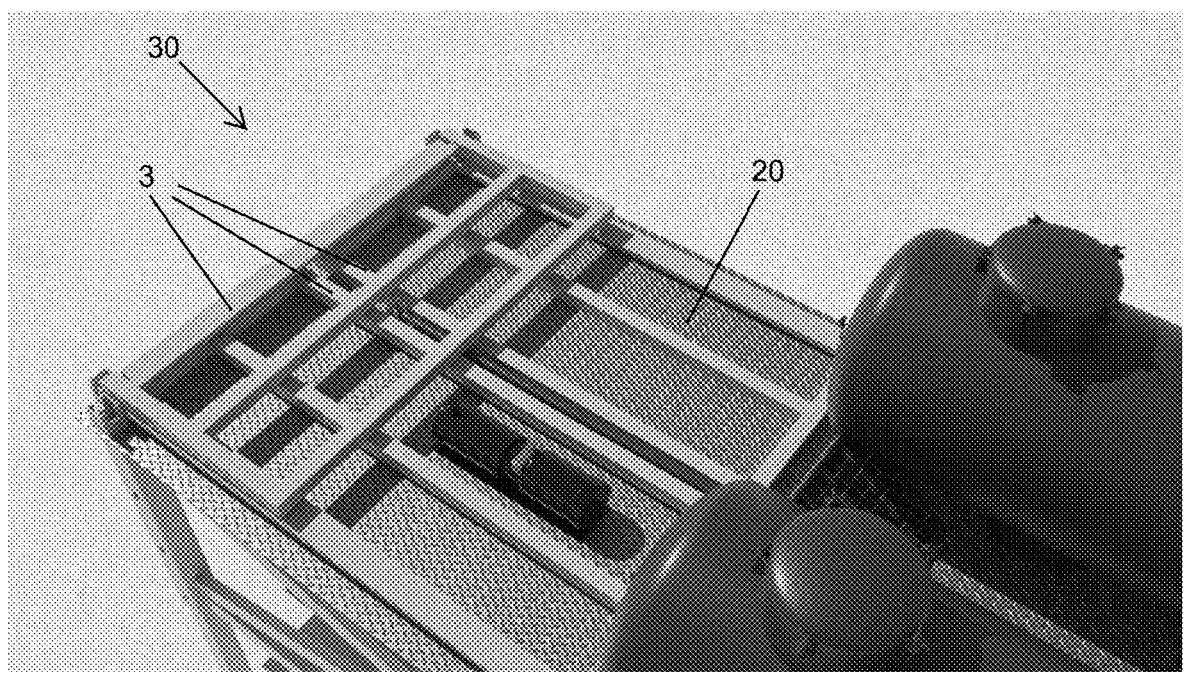
FIG. 6 is a perspective view showing a position of the folded rails when collapsed.
Figure 7:
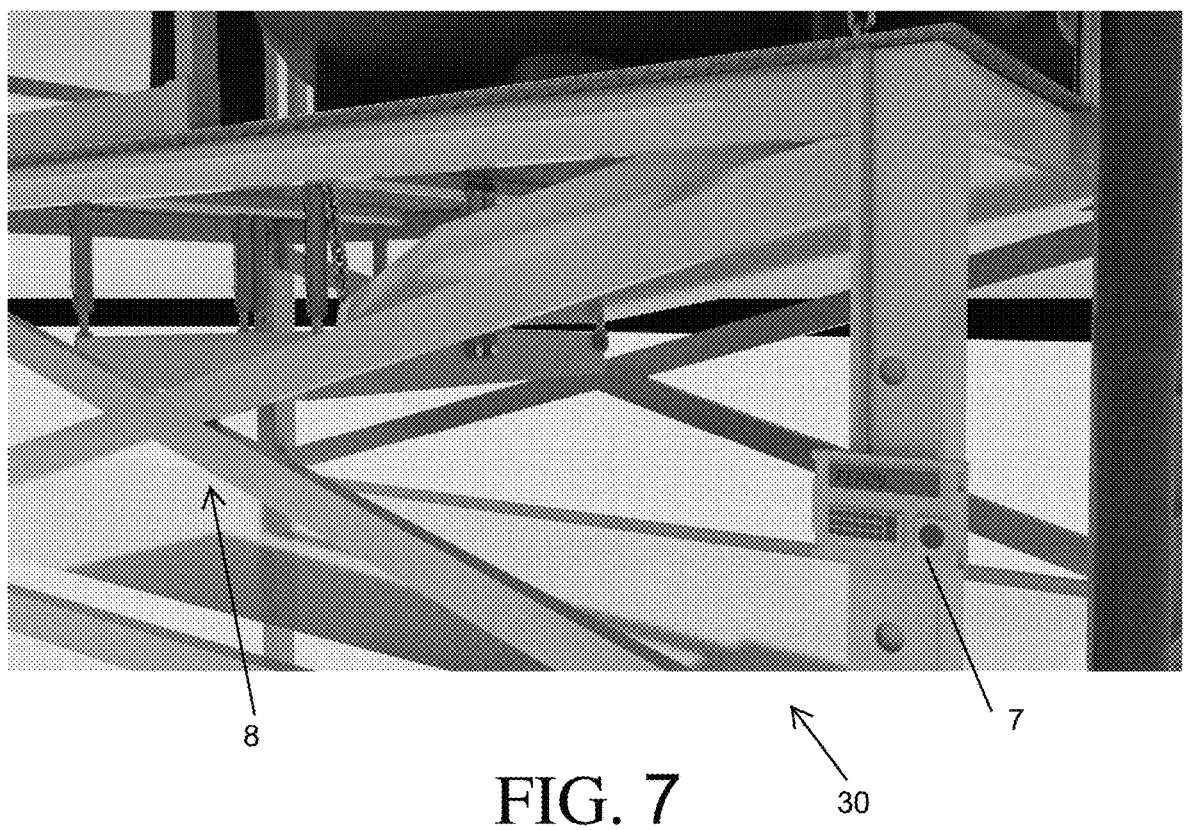
FIG. 7 is an enlarged perspective view of the control panel affixed to the frame.
Figure 8:
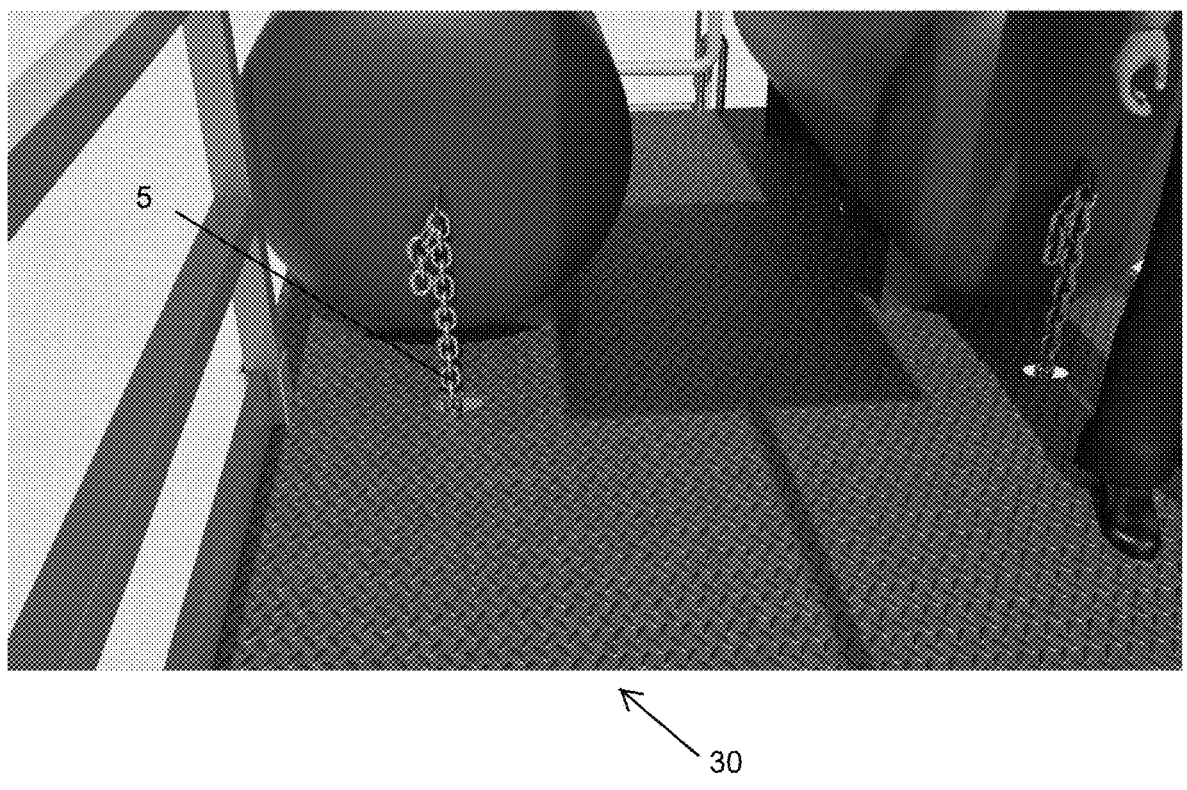
FIG. 8 is a perspective view showing the chains passing downwardly through the top platform of the frame.
Figure 9:
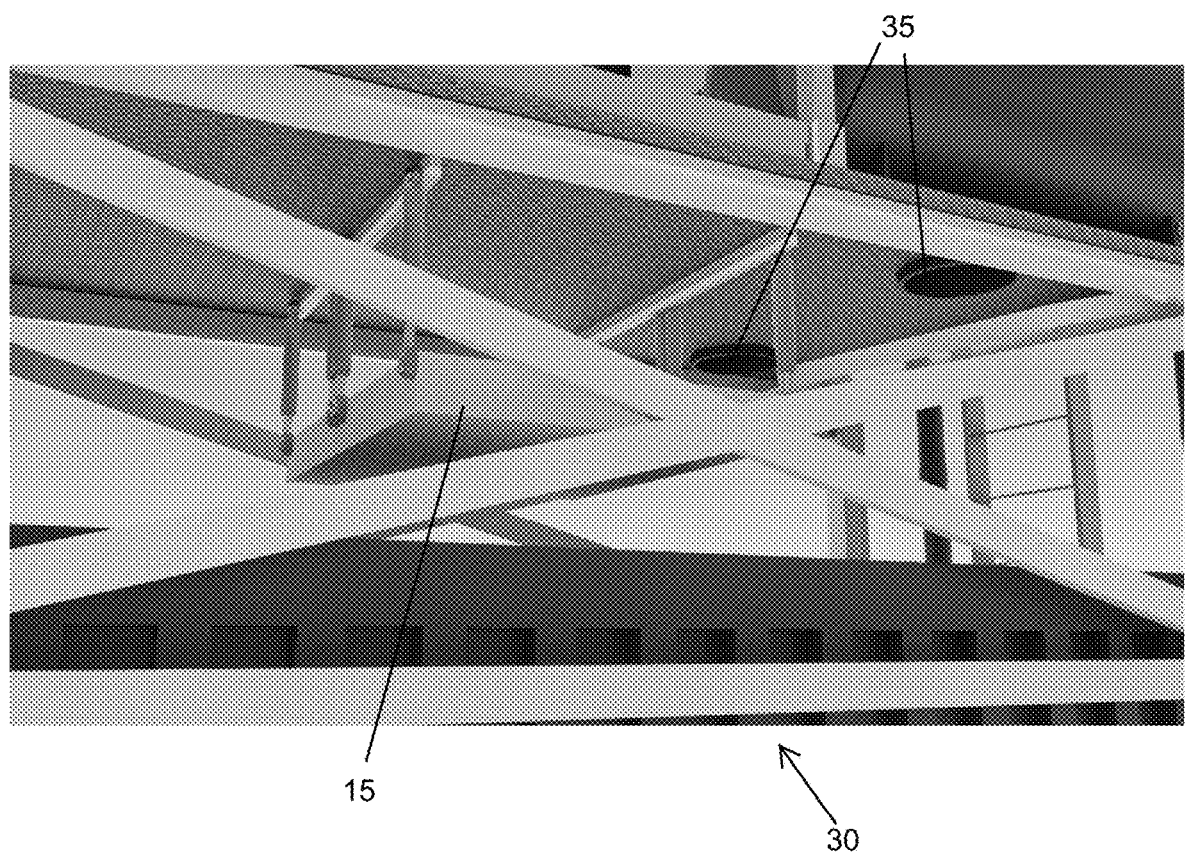
FIG. 9 is a perspective view showing the location of the apertures relative to the chute and the sandbox beneath the top platform.
Figure 10:
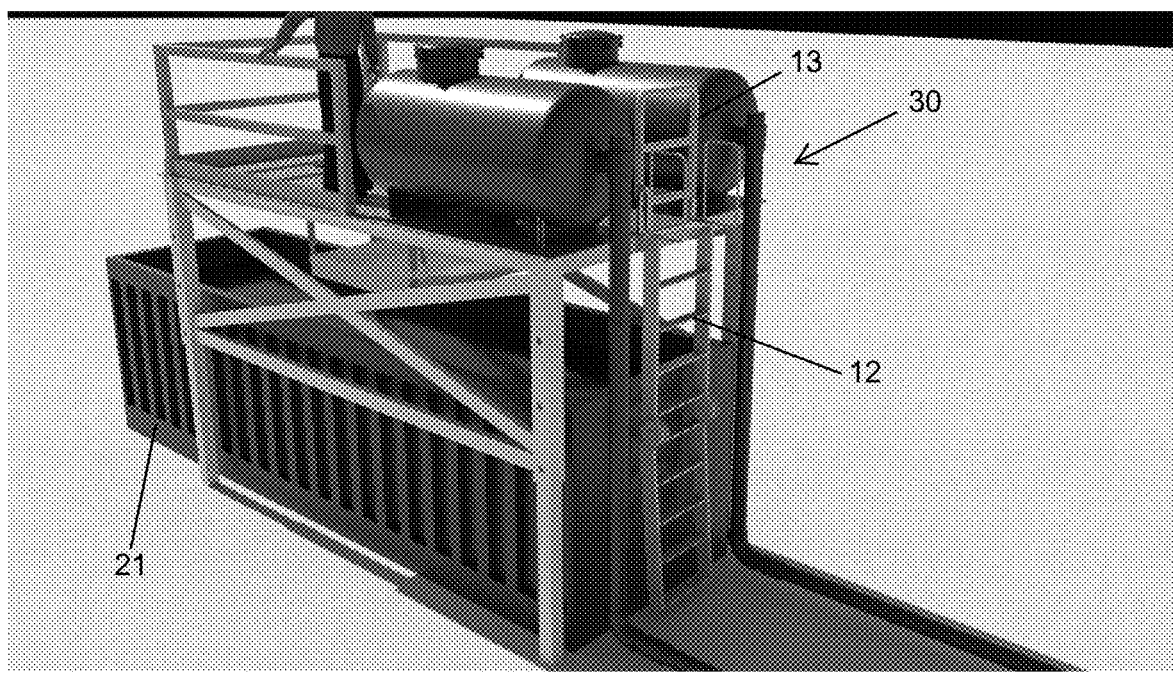
FIG. 10 is a perspective view showing a fluid collection tank situated beneath the system for receiving the fluid therein.
Figure 11:
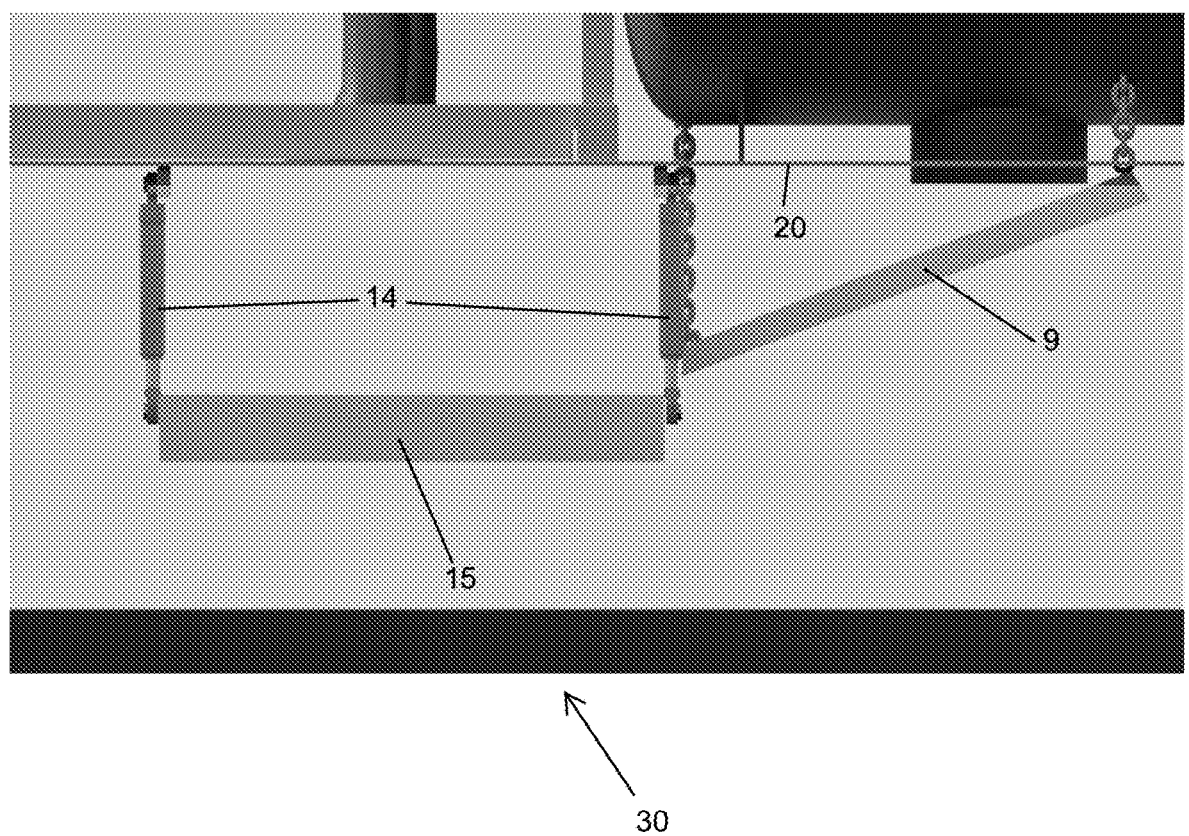
FIG. 11 is a side elevational view showing interrelationship between the gas buster tank, chute, and sandbox.
Figure 12:
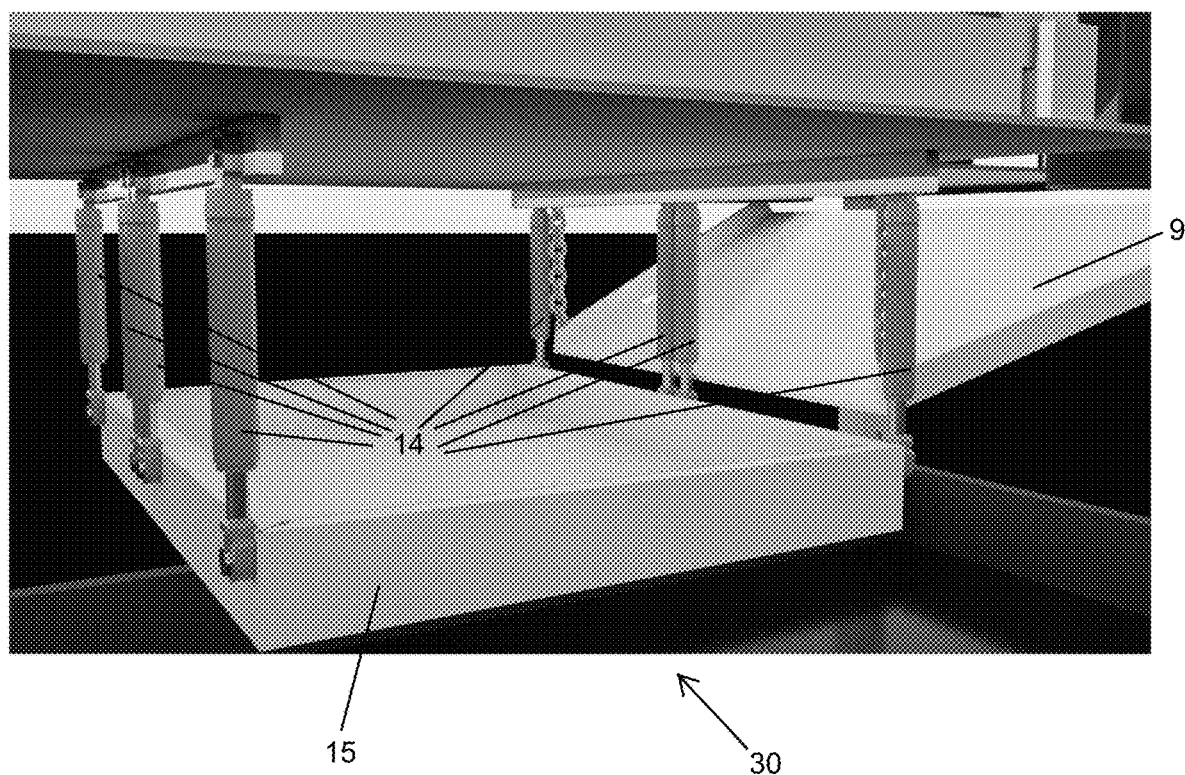
FIG. 12 is a perspective view showing the structural configuration of the hydraulic cylinders and sandbox.
Figure 13:
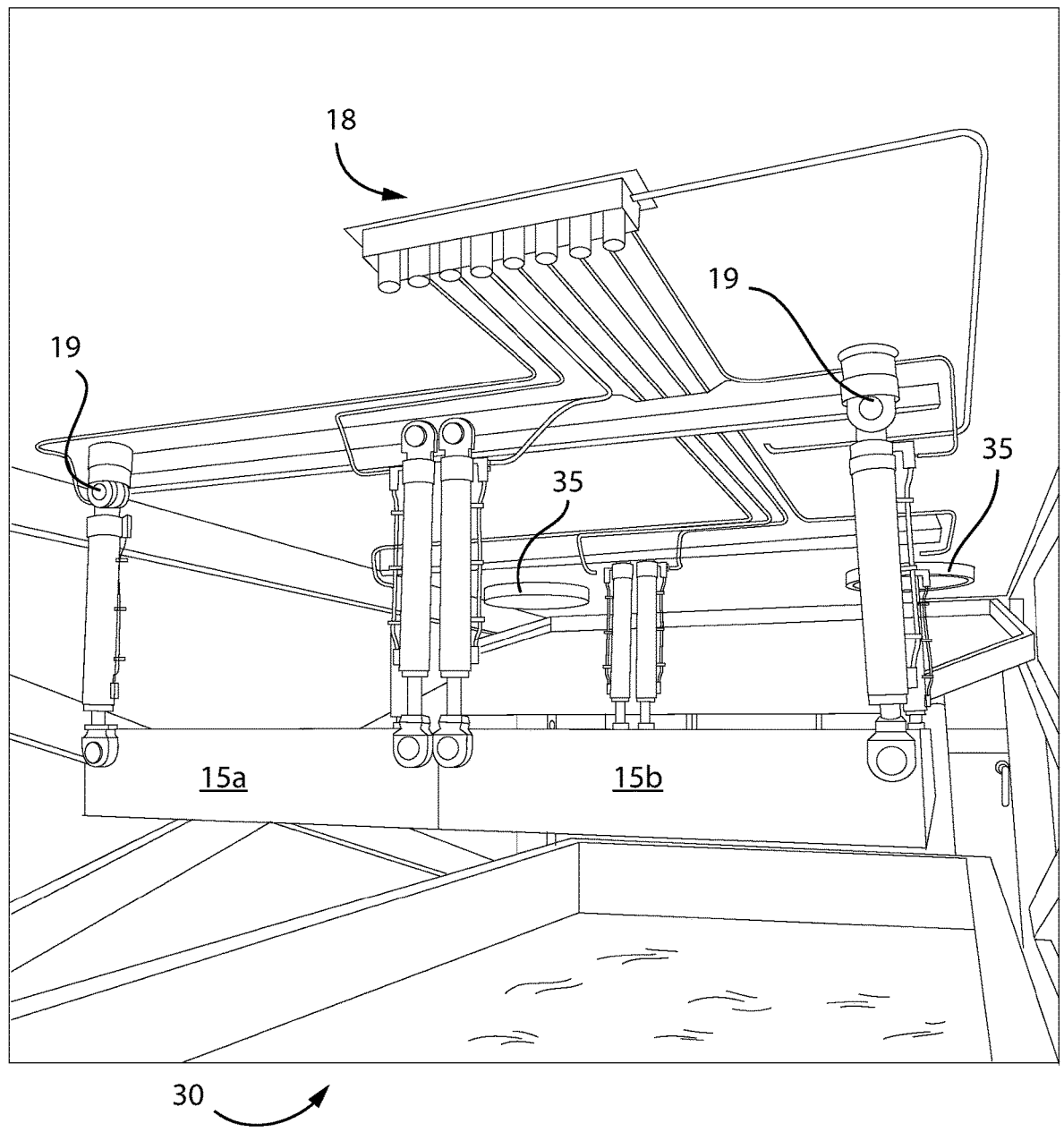
FIG. 13 is a perspective view showing the structural configuration of the hydraulic cylinders, sandbox, manifold, and scales.
Figure 14:
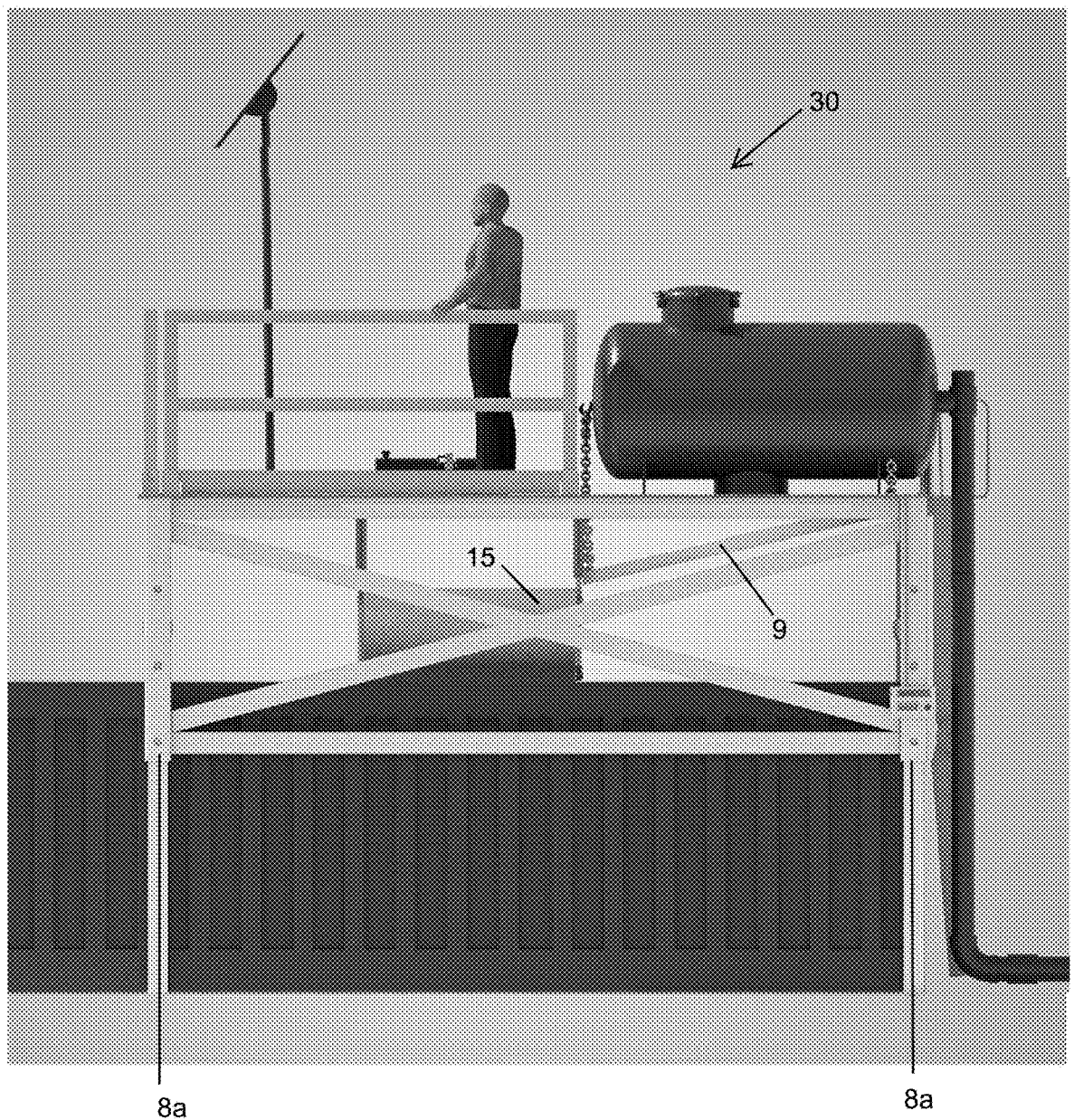
FIG. 14 is a side elevational view showing the frame legs at an extended (raised) position.
Figure 15:
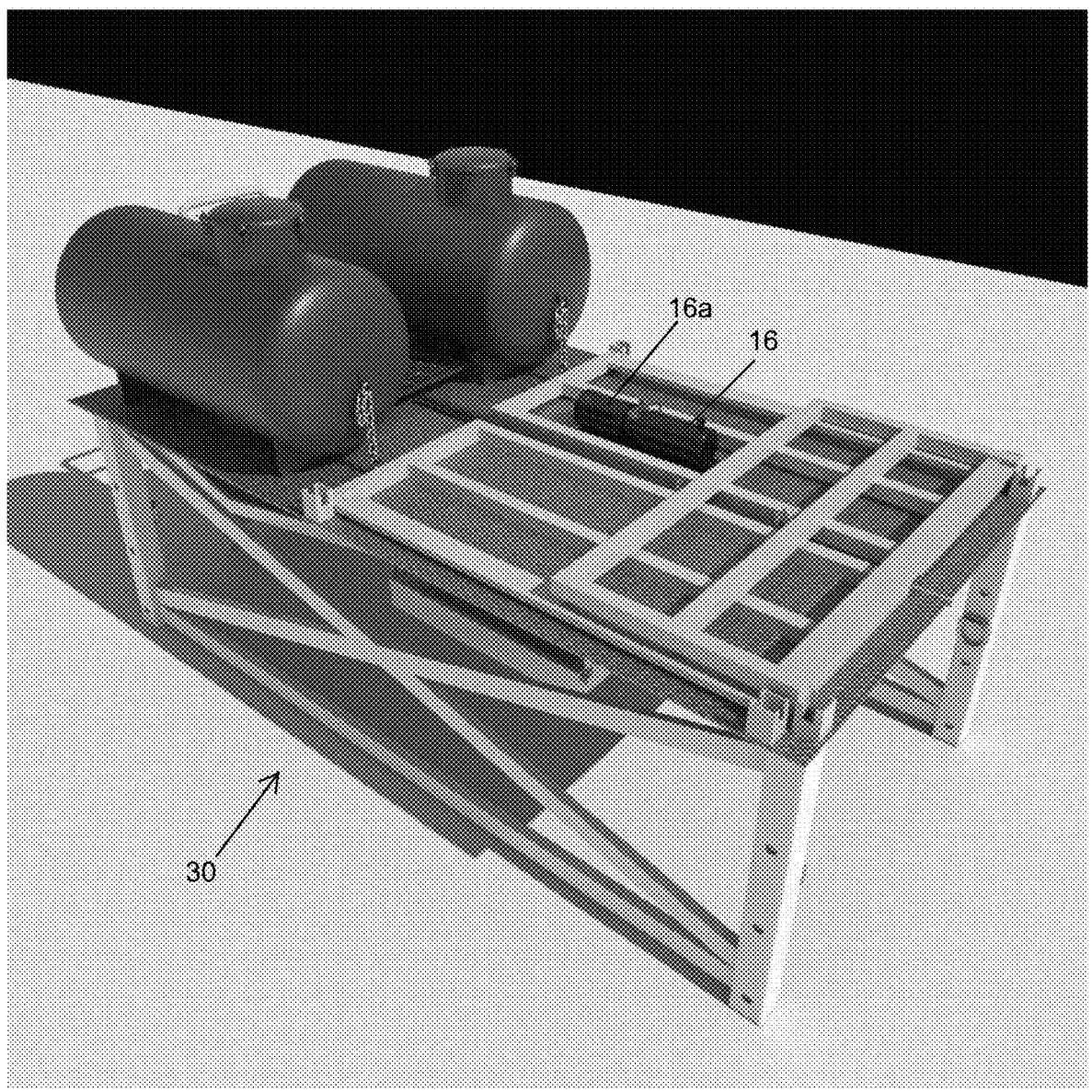
FIG. 15 is a perspective view showing the frame legs at a retracted (lowered) position.
Figure 16:
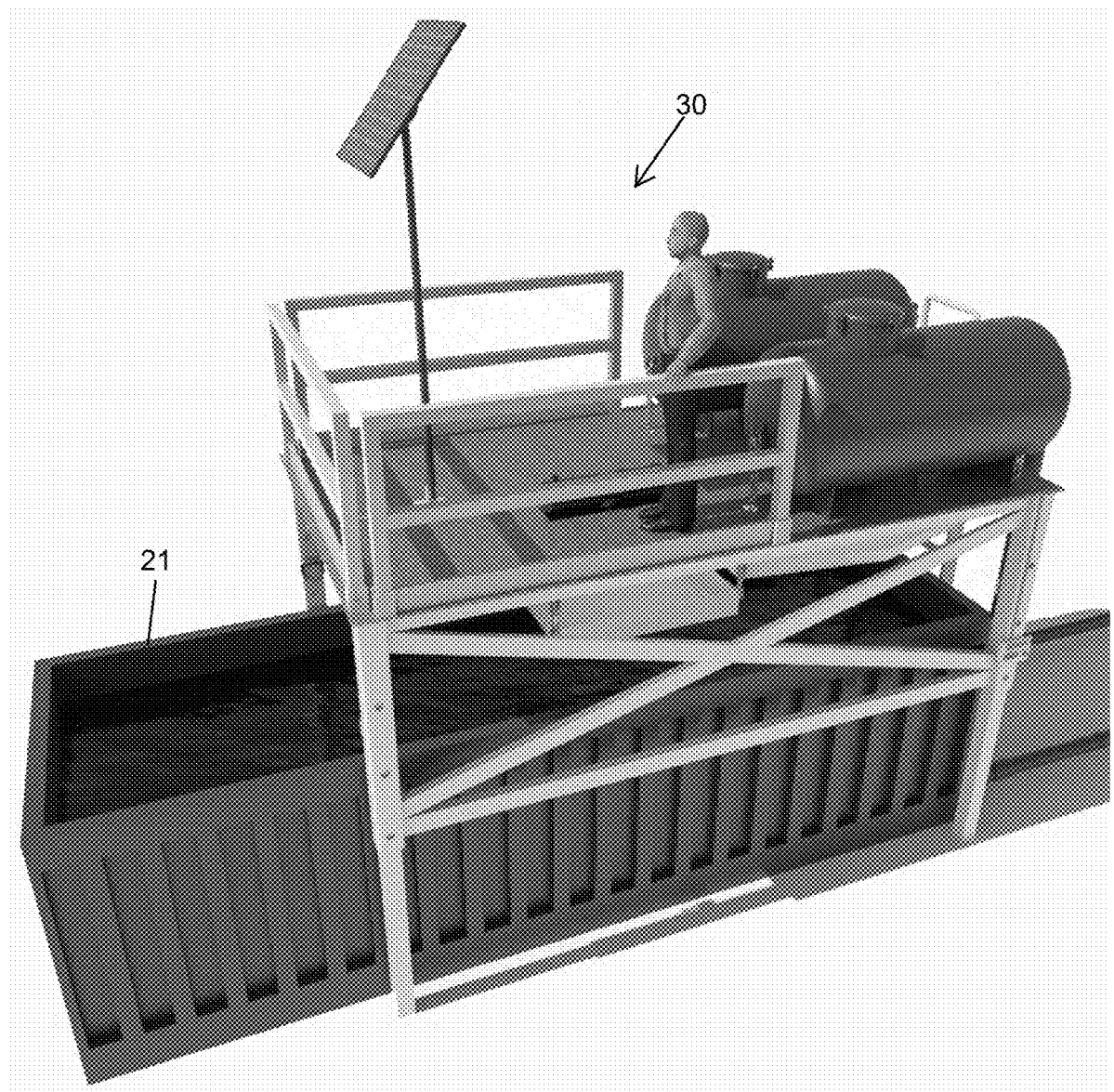
FIG. 16 is a perspective view showing the system positioned over a fluid collection tank.
Figure 17:
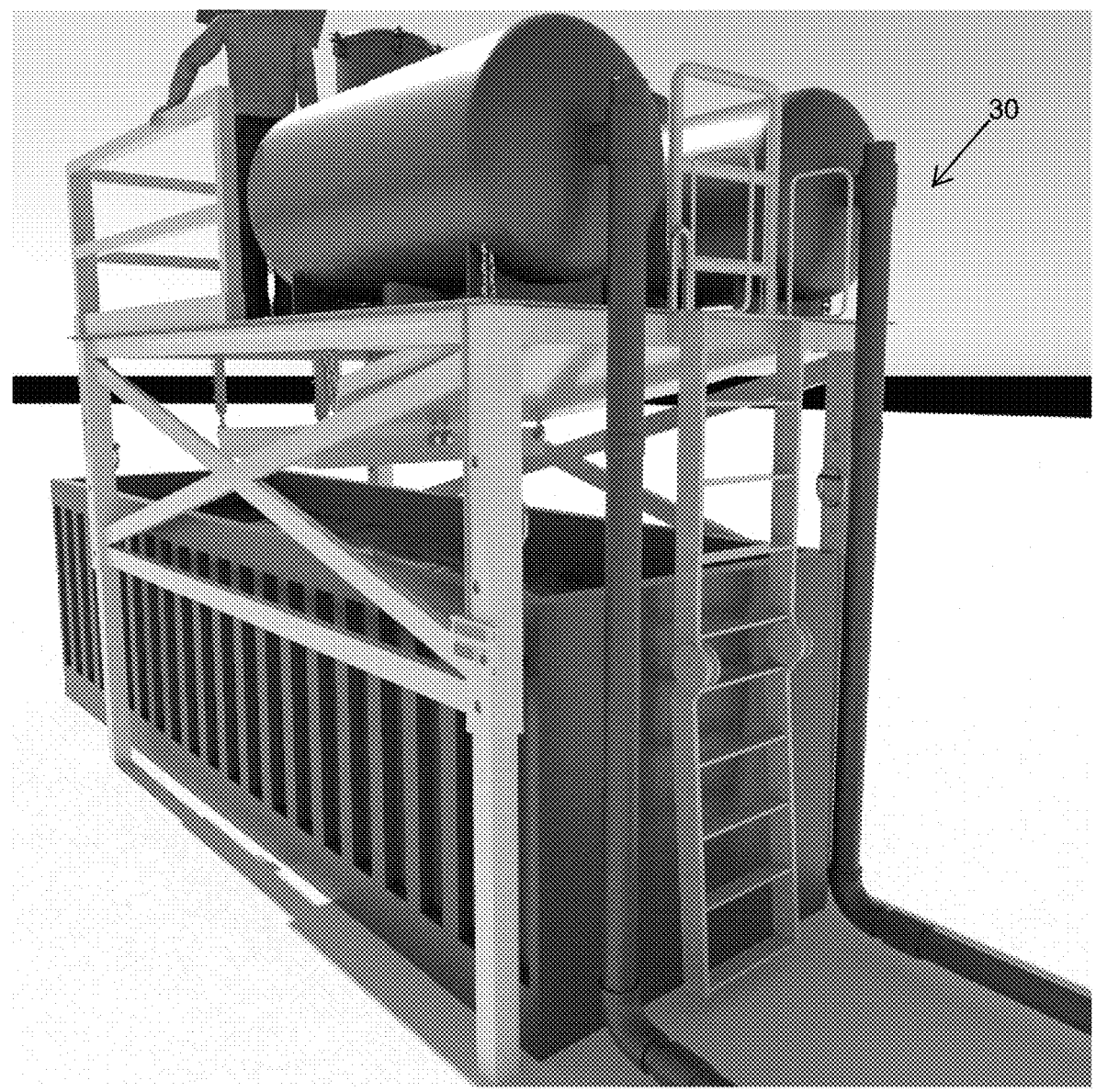
FIG. 17 is another perspective view showing the system positioned over a fluid collection tank.
Figure 18:
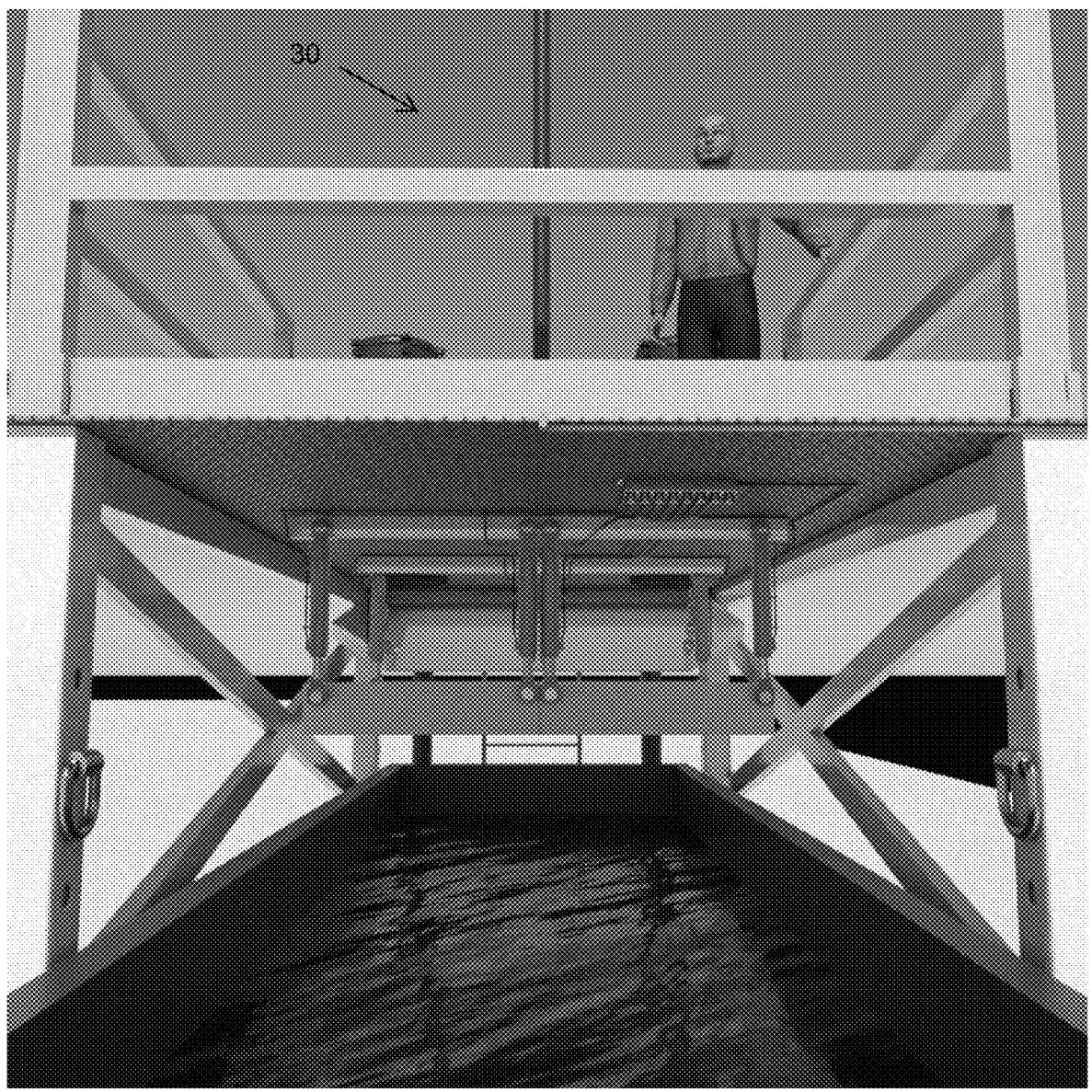
FIG. 18 is an enlarged front elevational view showing the system positioned over a fluid collection tank wherein the sandbox is at a closed position.
Figure 19:
FIG. 19 is an enlarged front elevational view showing the system positioned over a fluid collection tank wherein the sandbox is at an open position.
Figure 20:
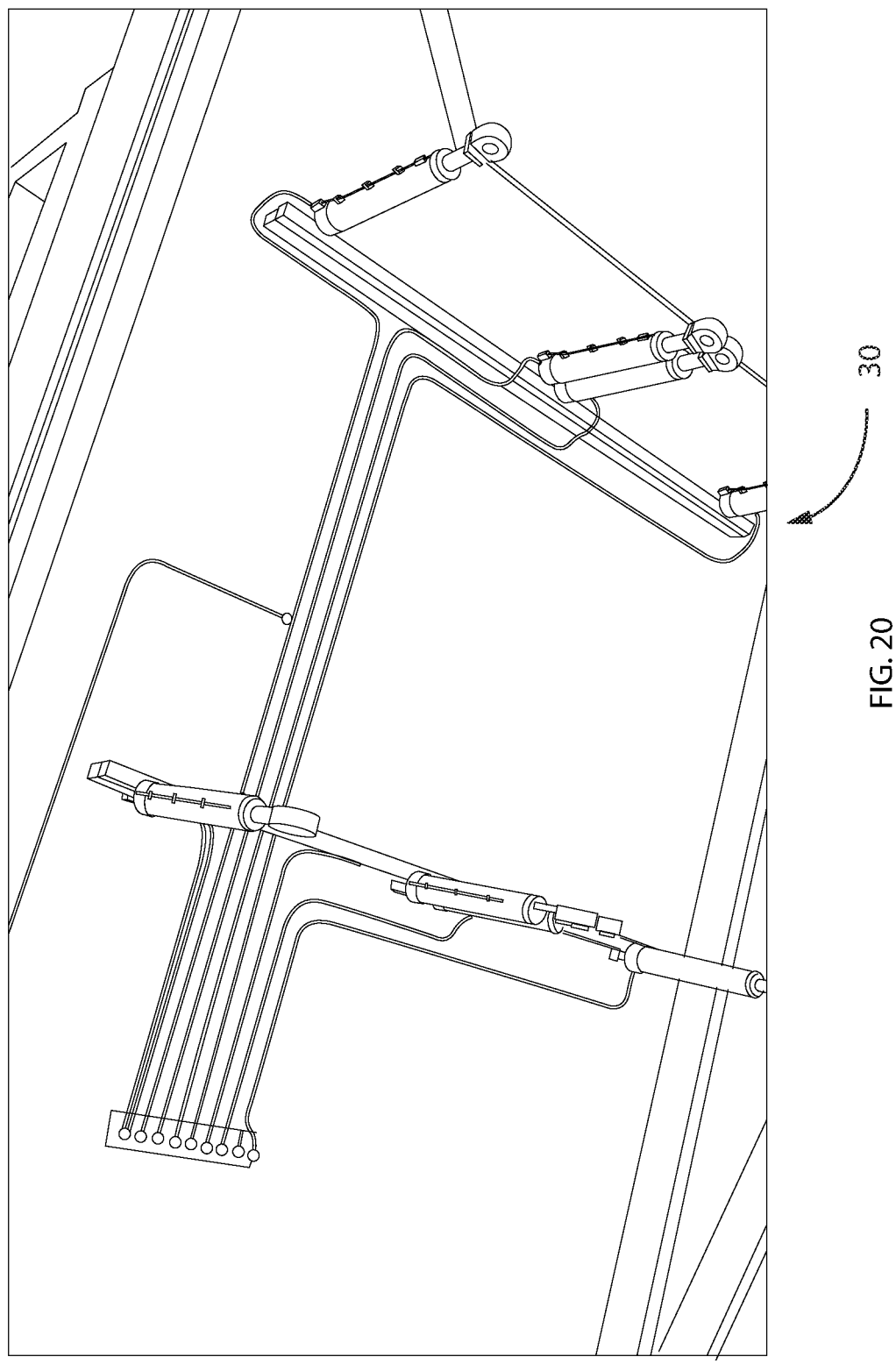
FIG. 20 is another perspective view showing the structural configuration of the hydraulic cylinders, manifold, and sandbox beneath the top platform.

The non-limiting exemplary embodiment(s) is/are referred to generally in FIGS. 1-20 and is/are intended to provide an automated sand management system 30 which may be used during a process of fluid removal from a wellbore. The present disclosure is superior to other systems in that it effectively monitors and controls sand during the process of fluid removal from a wellbore. Ultimately removing commons issues from improper and faulty means of sand monitoring.

In a non-limiting exemplary embodiment, an automated sand management system 30 may be used during a process of fluid removal from a wellbore. The automated sand management system 30 includes a platform that is shipped to the location and then extended to fit over fluid collection tank(s) 21. The platform includes extendible legs 8a. The automated sand management system 30 further includes two "gas buster" tanks 4, OSHA approved safety railing 3 and foldable ladder 12, an adjustable chain suspended slide 9, a hydraulic controlled sandbox 15, a hydraulic pump 16 and manifold 18, LCD control panel 7, and solar panel 1. The system 30 allows for remote login monitoring. The automated sand management system 30 provides the ability to view sand production numbers made from the day as wellbore opens through a current date. This will allow the parties responsible for the wellbore to see numbers first-hand. This system 30 does not remove the sand from the fluids being removed from the wellbore, however, it does monitor and report actual sand production from a wellbore.

Referring to FIGS. 1-20, the automated sand management system 30 includes a portable and transportable frame 8 having a top platform 20 configured to be fitted over an existing fluid collection tank 21 associated with an existing wellbore, a power source 1 (e.g., solar panel 1, generator, etc.) located at the frame 8, a control panel 7 operably coupled to the power source 1, an input pipe 10 supported at the frame 8 and configured to receive fluid removed from the existing wellbore, a gas buster tank 4 supported at the frame 8 and in communication with the control panel 7 as well as the input pipe 10, wherein the gas buster tank 4 is configured to stabilize the fluid by relieving gas pressure from the fluid removed from the existing wellbore, an adjustable chain suspended chute 9 in fluid communication with the gas buster tank 4 and situated subjacent thereto, wherein the adjustable chain suspended chute 9 is configured to receive the fluid from the gas buster tank 4, a power-actuated sandbox 15 in communication with the adjustable chain suspended slide 9 and configured to receive the fluid from the adjustable chain suspended chute 9, and a scale 19 operably coupled to the power-actuated sandbox 15 and the control panel 7. Advantageously, the scale 19 is configured to weigh and report actual sand production in the fluid removed from the existing wellbore. For example, the scale 19 is programmed to measure the increase/decrease in internal pressure within the hydraulic cylinders 14 and transmits such data to the control panel 7, which interprets the data and calculates the weight of the sand and the fluid. With such information, the control panel 7 is able to determine the quantity of sand per weight unit of fluid. Such calculations may be performed by a processor having a memory containing a software program product with an executable control logic algorithm. Such an algorithm may be programmed to determine different types of sand in a variety of fluids by measuring their combined weight and relative individual weight. Such a structural configuration provides the new, useful, and unexpected benefit of facilitating transport and maneuverability of the system 30 to a variety of remote locations for succinctly and accurately reporting sand quantity in the extracted fluid. Also, effectively monitors and controls sand during the process of fluid removal from a wellbore. Ultimately removing commons issues from improper and faulty means of sand monitoring.

In a non-limiting exemplary embodiment, the power-actuated sandbox 15 includes a hydraulic pump 16 attached to the top platform 20, a manifold 18 operably coupled to the hydraulic pump 16, a plurality of hydraulic cylinders 14 coupled to the manifold 18 and configured to telescopically extend and retract, and a compressor 16a operably coupled to the hydraulic pump 16. Advantageously, the hydraulic pump 16 is operably connected to the control panel 7 and configured to facilitate articulation of the power-actuated sandbox 15 between open and closed positions when the hydraulic cylinders 14 extend and retract, respectively. Such a structural configuration provides the new, useful, and unexpected benefit of allowing the system 30 to be raised and lowered to be adjusted to desired height while providing the ability of lowering onto or off of a transport trailer used to carry the equipment from location to location.

In a non-limiting exemplary embodiment, the hydraulic cylinders 14 are attached to four corners of the power-actuated sandbox 15. Such a structural configuration provides the new, useful, and unexpected benefit of succinctly and quickly opening and closing the sandbox 15, as needed, and without interference from the weight of the fluid. The sandbox 15 may be bifurcated into a first half 15a and a second half 15b each having an adjoining edge abutted together when the sandbox 15 is at a closed position.

In a non-limiting exemplary embodiment, the frame 8 includes a collapsible safety railing 3 pivotally attached to the top platform 20, and a plurality of extendible legs 8a attached to the top platform 20 and directed downwardly therefrom. Such a structural configuration provides the new, useful, and unexpected benefit of ensuring a user is safely supporting on the top platform 20.

In a non-limiting exemplary embodiment, the frame 8 further includes a foldable ladder 12 connected to the top platform 20, and a self-closing gate 13 situated proximate to the foldable ladder 12. Such a structural configuration provides the new, useful, and unexpected benefit of ensuring a user is able to succinctly and quickly access the top platform 20.

In a non-limiting exemplary embodiment, the control panel 7 is configured for remote user access and operation. Such a structural configuration provides the new, useful, and unexpected benefit of facilitating remote monitoring by a service provider and/or user that is not located at the system 30 location.

In a non-limiting exemplary embodiment, the top platform 20 has an aperture 35. Advantageously, the adjustable chain suspended chute 9 is aligned beneath the aperture 35 and configured to receive the fluid discharged from the gas buster tank 4. Such a structural configuration provides the new, useful, and unexpected benefit of ensuring the fluid is succinctly and quickly discharged from the gas buster tank 4 to the sandbox 15 therebelow.

In a non-limiting exemplary embodiment, the hydraulic cylinders 14 are operably coupled to the scale 19. Advantageously, the scale 19 is in operable communication with the control panel 7 for determining and transmitting a weight of the fluid. Such a structural configuration provides the new, useful, and unexpected benefit of accurately detecting the sand quantity in the fluid when there is a heavy load of the fluid collected in the sandbox 15.

In a non-limiting exemplary embodiment, the adjustable chain suspended chute 9 is obliquely angled and sloped downwardly from the top platform 20 to the power-actuated sandbox 15. Such a structural configuration provides the new, useful, and unexpected benefit of ensuring the fluid freely flows downwardly and away from the gas buster tank 4 and to the sandbox 15.

The present disclosure further includes a method of utilizing an automated sand management system 30 for monitoring and reporting actual sand production in fluid removed from an existing wellbore. Such a method includes the steps of: providing and fitting a portable and transportable frame 8 has a top platform 20 over an existing fluid collection tank 21 associated with an existing wellbore; providing and locating a power source 1 at the frame 8; providing and operably coupling a control panel 7 to the power source 1; providing and supporting an input pipe 10 at the frame 8; providing and supporting a gas buster tank 4 at the frame 8; communicating the gas buster tank 4 with the control panel 7 as well as the input pipe 10; providing and fluidly communicating an adjustable chain suspended chute 9 with the gas buster tank 4; situating the adjustable chain suspended chute 9 subjacent to the gas buster tank 4; the adjustable chain suspended chute 9 receiving the fluid from the gas buster tank 4; providing and communicating a power-actuated sandbox 15 with the adjustable chain suspended slide 9; and providing and operably coupling a scale 19 to the power-actuated sandbox 15 and the control panel 7. Such a methodology provides the new, useful, and unexpected benefit of facilitating transport and maneuverability of the system 30 to a variety of remote locations for succinctly and accurately reporting sand quantity in the extracted fluid.

The method further includes the steps of: the input pipe 10 receiving fluid removed from the existing wellbore; the gas buster tank 4 stabilizing the fluid by relieving gas pressure from the fluid removed from the existing wellbore; the power-actuated sandbox 15 receiving the fluid from the adjustable chain suspended chute 9; and the scale 19 weighing and reporting actual sand production in the fluid removed from the existing wellbore. Such a methodology provides the new, useful, and unexpected benefit of facilitating transport and maneuverability of the system 30 to a variety of remote locations for succinctly and accurately reporting sand quantity in the extracted fluid.

In a non-limiting exemplary embodiment, the automated sand management system 30 includes the platform with extendible legs 8a, two "gas buster" tanks 4, OSHA approved safety railing 3 and foldable ladder 12, adjustable chain suspended slide 9, hydraulic controlled sandbox 15 hydraulic pump 16 and manifold 18, LCD control panel 7, and solar panel 1. The two "gas buster" tanks 4 are provided for stabilizing the fluids by relieving gas pressure, which in turn converts the pressure of the fluid and sand into volume. A self-closing safety gate 13 is positioned between the two "gas buster" tanks 4. The OSHA approved safety railing 3 and foldable ladder 12 break down for storage and transportation. The adjustable chain suspended slide 9 directs fluid and sand from "gas buster" tanks 4 above. The hydraulic controlled sandbox 15 is provided for collection and weighing of sand. The LCD control panel 7 is configured to be used for controlling and monitoring the equipment. Allowing a remote login from anywhere using your computer, table, or phone.

In a non-limiting exemplary embodiment, the gas buster tank(s) 4 may be mud gas separator tanks that are crucial for projects involving heavy-duty drilling. The gas buster tank(s) 4 remove free and entrained gas mixed with drilling fluids (mud), allowing gases such as methane and carbon dioxide to escape, preventing blowouts. The gas buster tank(s) 4 dissipate high-pressure drilling fluids, effectively dissipate high-energy gases found in oil and gas fields, stabilize mud viscosity, and are used to flow back a well bore during drilling.

In a non-limiting exemplary embodiment, the present disclosure provides onsite power which removes the use and need of an external motor or power source 1. The solar panel 1 is supported via the solar panel pole 2 which may collapse to the platform. Of course, a generator may be employed in lieu of the solar panel 1.

In a non-limiting exemplary embodiment, the process is as follows: as fluid is extracted from the wellbore through several key pieces of equipment with different functions. One function is to remove sand from the wellbore. Once the sand is dumped from its key equipment, it passes through this "gas buster" tank 4, and the fluids fall through the aperture 35 in the platform located under the gas buster tank 4 with the sand that comes with it. Once it falls through the aperture 35, it hits a slide and comes to rest in a two-part capture box (sandbox 15) underneath. This sandbox 15 is supported by eight hydraulic cylinders 14. The four corner cylinders 14 are attached to an electronic scale 19, which sends the accurate weight data to the control panel 7 and also to remote monitoring locations. Allowing accurate weight down to the half-pound. Once weighed, the sandbox 15 is opened with the hydraulic cylinders 14 to let the collected sand fall into the collection tank 21 below. The sandbox 15 then returns to a closed position, ready for the next round of sand.

Glossary of Selected Major Components

Solar panel 1
Solar panel pole 2 that collapses to the platform
Safety rails 3
Gas buster tanks 4
Chute adjustment chains 5
Transport tie-downs 6
Control panel 7
Steel frame 8 with extending legs 8a for variable height
Oil/Sand guide chute 9
Input pipes from wellbore 10
Frame feet to keep from sinking 11
Collapsible ladder 12
Self-closing safety gate 13
Eight Hydraulics (hydraulic cylinders 14)
Sandbox 15 that weighs the sand
Compressor 16a for hydraulics 14
Control panel cable channel 17
Hydraulic manifold 18
Scale 19 attached to outer corner hydraulics 14 for weighing sand In a non-limiting exemplary embodiment, the automated sand management system 30 can be used during the process of fluid removal from the wellbore. It allows for remote login monitoring into the control panel 7 and provides the ability to view sand production numbers made from the day the well opens through the current date. This will allow the parties responsible for the wellbore to see the numbers firsthand. As well as having an accurate method to real sand production.

In a non-limiting exemplary embodiment, this system 30 does not remove the sand from the fluid being removed from the wellbore, but it does however monitor and report actual sand production from the wellbore.

In a non-limiting exemplary embodiment, the automated sand management system 30 includes a metal top platform 20 that is shipped to the location and then extended to fit over fluid collection tank(s) 21. The steel platform 20 includes extendible steel legs 8a; two "gas buster" tanks 4 for stabilizing the fluids by relieving gas pressure; certified safety railing 3 and foldable ladder 12 which break down for storage and moving; adjustable chain suspended chute 9 for directing fluid and sand from "gas buster" tanks 4 above; hydraulic controlled capture box for collection and weighing of fluid and sand; hydraulic controller and manifold 18; LCD control panel 7 for controlling and monitoring the equipment; solar panel 1 for onsite power.

In a non-limiting exemplary embodiment, the process of removing sand from the fluid is described as follows: as the fluids come from the wellbore, they go through several pieces of equipment with different functions. One function is to relieve the pent-up pressure in the fluid line. Once the fluids pass through this "gas buster" tank, the fluids fall through the bottom of the tank with the sand that comes with it. Once it falls through the tanks it hits a slide and comes to rest in a two-part capture box underneath. This capture box (sandbox) is supported by eight hydraulic cylinders 14. The four corner cylinders 14 are attached to an electronic scale 19, which sends the accurate weight data to the control panel 7 and also to remote monitoring locations. Once weighed, the capture box is opened with the hydraulic cylinders 14 to let the fluid and sand fall into the tank below. The capture box then returns to the up position ready for the next round of fluid and sand.

In a non-limiting exemplary embodiment, the system 30 is made to easily break down to half of its size for efficient shipping to a new location.

In a non-limiting exemplary embodiment, the steel plate on the top platform 20 may be replaced with a grating style floor, to save weight and allow a view of the tank and sandbox 15 below.

In a non-limiting exemplary embodiment, the solar panel 1 may be removed and utilize an external power source such as a generator.

In a non-limiting exemplary embodiment, a transport beam may be added that is either removable or permanent. This beam runs across the width of the unit.

In a non-limiting exemplary embodiment, hydraulics 14 may be added to the outside of the four legs 8a to allow the system 30 to be a self-loading and unloading system 30.

In a non-limiting exemplary embodiment, the system 30 is built on a square tubing box style frame 8, using a grating style platform which is mounted on top of the frame 8. Using this style as a platform will allow visual inspection of the components below. The platform is to be used to mount handrails 3, two gas busters (which the flow goes into), and the hydraulic system 30 which controls the unit. There are various pad eyes mounted underneath the unit to hold the sandbox 15 in place. The sandbox 15 collects the sand/fluid, which is tied into the hydraulic system 30 that controls the cylinders 14 which activate and dump the sand collected in the box. This disclosure is fully adjustable as far as height. Which can be adjusted per tank that is placed under the unit. It is a self-loading and unloading system 30. Consisting of hydraulics 14 attached to the four legs 8a to allow the unit to be raised and lowered to be adjusted to desired height while providing the ability of lowering onto or off of a transport trailer used to carry the equipment from location to location.

In a non-limiting exemplary embodiment, the system 30 provides accurate sand measurements to the operating company while simultaneously providing them with real time information of the production. This unit is set up with 2 gas buster which receive the flow from the sand traps and de-sanders when flushed and or dumped. The flow then goes down the bottom side of the gas buster after full force of fluid is dispersed inside of the gas buster and onto a slide which is adjusted with the correct angle according to the chain adjustments. The angle of this slide is set to correspond with the sand box mounted underneath the unit. The flow goes down the slide into the sand box and collects.

In a non-limiting exemplary embodiment, the base of this sandbox 15 is designed to remove fluid from the contents contained in the box. Once the weight is recorded the unit will dump through its current cycle and reset to be ready for the next reading. We use a torque tube design over a digital scale 19 to provide a more accurate reading of sand numbers. The torque tube design will not register any effects from wind and movement from the sandbox 15. As the only way to detect weight is for the torque tube to be pulled on from the sand in the box below. The amount of sand recorded can be monitored wirelessly through a monitoring system 30.

In a non-limiting exemplary embodiment, there are multiple levels of access to the monitoring system 30. Level 1—the most limited level of them all. This gives access to the system 30 and past trends of sand production to the employees (e.g., well testers, flow hands) that are personally working around the equipment. Level 2—the management of the employees (e.g., well testers, flow hands) by the employer. Allowing them to be involved with current sand production. Basically, aiming to cut out the middleman when relaying sand production. Giving them a chance to prepare for further actions needed as the well continues to clean up the sand. Level 3—this level gives the operating company access to all real time information as the past two levels but more advanced views and information. Level 4—this level is for our company and the manufacturing company that is producing the product. This allows full adjustments and customization of the system 30. Allowing us to make subtle changes when required. As well as making minor equipment repairs if it is not mechanically involved. Level 5—this is the monitoring system 30s original designer access. This gives them the ultimate access when needed to troubleshoot issues and correct them beyond our knowledge. Overall, it is a simple design that will hopefully gain attention for giving the operating companies a peace of mind of actual sand production during their well testing phase before the well is turned over to their own equipment.

In a non-limiting exemplary embodiment, the automated sand management system 30 includes a platform that is able to be shipped to a desired location and then extended to fit over fluid collection tank(s) 21. The platform includes extendible legs 8a that are adjusted to desired height using pins to hold in that position. The platform and legs 8a include steel or other suitable material. The automated sand management system 30 further includes two "gas buster" tanks 4, OSHA approved safety railing 3 and foldable ladder 12, an adjustable chain suspended slide 9, a hydraulic controlled sandbox 15, a hydraulic pump 16, and manifold 18, LCD control panel 7, and solar panel 1. The automated sand management system 30 monitors and reports actual sand production down to the half-pound that is being removed from a wellbore.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. An automated sand management system for monitoring and reporting actual sand production in fluid removed from an existing wellbore, said automated sand management system comprising:
    a frame having a top platform configured to fitted over an existing fluid collection tank associated with an existing wellbore;
    a power source located at said frame;
    a control panel operably coupled to said power source;
    an input pipe supported at said frame and configured to receive fluid removed from the existing wellbore;
    a gas buster tank supported at said frame and in communication with said control panel as well as said input pipe, said gas buster tank being configured to stabilize the fluid by relieving gas pressure from the fluid removed from the existing wellbore;
    an adjustable chain suspended chute in communication with said buster tank, said adjustable chain suspended chute being configured to receive the fluid from said gas buster tank;
    a power-actuated sandbox in communication with said adjustable chain suspended chute and configured to receive the fluid from said adjustable chain suspended chute; and
    a scale operably coupled to said power-actuated sandbox and said control panel, said scale being configured to weigh and report actual sand production in the fluid removed from the existing wellbore.

2. The automated sand management system of claim 1, wherein said power-actuated sandbox comprises:
    a hydraulic pump attached to said top platform;
    a manifold operably coupled to said hydraulic pump;
    a plurality of hydraulic cylinders coupled to said manifold and configured to telescopically extend and retract; and
    a compressor operably coupled to said hydraulic pump;
    wherein said hydraulic pump is operably connected to said control panel and configured to facilitate articulation of said power-actuated sandbox between open and closed positions when said hydraulic cylinders extend and retract, respectively.

3. The automated sand management system of claim 2, wherein said hydraulic cylinders are attached to four corners of said power-actuated sandbox.

4. The automated sand management system of claim 2, wherein said hydraulic cylinders are operably coupled to said scale, said scale being in operable communication with said control panel for determining and transmitting a weight of the fluid.

5. The automated sand management system of claim 1, wherein said frame comprises:
    a collapsible safety railing pivotally attached to said top platform; and
    a plurality of extendible legs attached to said top platform and directed downwardly therefrom.

6. The automated sand management system of claim 1, wherein said frame further comprises:
    a foldable ladder connected to said top platform; and
    a self-closing gate situated proximate to said foldable ladder.

7. The automated sand management system of claim 1, wherein said control panel is configured for remote user access and operation.

8. The automated sand management system of claim 1, wherein said top platform has an aperture, said adjustable chain suspended chute being aligned beneath said aperture and configured to receive the fluid discharged from said gas buster tank.

9. The automated sand management system of claim 1, wherein said adjustable chain suspended chute is obliquely angled and sloped downwardly from said top platform to said power-actuated sandbox.

10. An automated sand management system for monitoring and reporting actual sand production in fluid removed from an existing wellbore, said automated sand management system comprising:
    a portable and transportable frame having a top platform configured to be fitted over an existing fluid collection tank associated with an existing wellbore;
    a power source located at said frame;
    a control panel operably coupled to said power source;
    an input pipe supported at said frame and configured to receive fluid removed from the existing wellbore;
    a gas buster tank supported at said frame and in communication with said control panel as well as said input pipe, said gas buster tank being configured to stabilize the fluid by relieving gas pressure from the fluid removed from the existing wellbore;
    an adjustable chain suspended chute in fluid communication with said gas buster tank and situated subjacent thereto, said adjustable chain suspended chute being configured to receive the fluid from said gas buster tank;
    a power-actuated sandbox in communication with said adjustable chain suspended chute and configured to receive the fluid from said adjustable chain suspended chute; and
    a scale operably coupled to said power-actuated sandbox and said control panel, said scale being configured to weigh and report actual sand production in the fluid removed from the existing wellbore.

11. The automated sand management system of claim 10, wherein said power-actuated sandbox comprises:
    a hydraulic pump attached to said top platform;
    a manifold operably coupled to said hydraulic pump;
    a plurality of hydraulic cylinders coupled to said manifold and configured to telescopically extend and retract; and
    a compressor operably coupled to said hydraulic pump;
    wherein said hydraulic pump is operably connected to said control panel and configured to facilitate articulation of said power-actuated sandbox between open and closed positions when said hydraulic cylinders extend and retract, respectively.

12. The automated sand management system of claim 11, wherein said hydraulic cylinders are attached to four corners of said power-actuated sandbox.

13. The automated sand management system of claim 11, wherein said hydraulic cylinders are operably coupled to said scale, said scale being in operable communication with said control panel for determining and transmitting a weight of the fluid.

14. The automated sand management system of claim 10, wherein said frame comprises:
    a collapsible safety railing pivotally attached to said top platform; and
    a plurality of extendible legs attached to said top platform and directed downwardly therefrom.

15. The automated sand management system of claim 10, wherein said frame further comprises:
    a foldable ladder connected to said top platform; and
    a self-closing gate situated proximate to said foldable ladder.

16. The automated sand management system of claim 10, wherein said control panel is configured for remote user access and operation.

17. The automated sand management system of claim 10, wherein said top platform has an aperture, said adjustable chain suspended chute being aligned beneath said aperture and configured to receive the fluid discharged from said gas buster tank.

18. The automated sand management system of claim 10, wherein said adjustable chain suspended chute is obliquely angled and sloped downwardly from said top platform to said power-actuated sandbox.

19. A method of utilizing an automated sand management system for monitoring and reporting actual sand production in fluid removed from an existing wellbore, said method comprising the steps of:
    providing and fitting a portable and transportable frame having a top platform over an existing fluid collection tank associated with an existing wellbore;
    providing and locating a power source at said frame;
    providing and operably coupling a control panel to said power source;
    providing and supporting an input pipe at said frame;
    providing and supporting a gas buster tank at said frame;
    communicating said gas buster tank with said control panel as well as said input pipe;
    providing and fluidly communicating an adjustable chain suspended chute with said gas buster tank;
    situating said adjustable chain suspended chute subjacent to said gas buster tank;
    said adjustable chain suspended chute receiving the fluid from said gas buster tank;
    providing and communicating a power-actuated sandbox with said adjustable chain suspended chute;
    providing and operably coupling a scale to said power-actuated sandbox and said control panel;
    said input pipe receiving fluid removed from the existing wellbore;
    said gas buster tank stabilizing the fluid by relieving gas pressure from the fluid removed from the existing wellbore;
    said power-actuated sandbox receiving the fluid from said adjustable chain suspended chute; and
    said scale weighing and reporting actual sand production in the fluid removed from the existing wellbore.

* * * * *